United States Patent [19]
Smirl

[11] Patent Number: 5,390,896
[45] Date of Patent: Feb. 21, 1995

[54] ENERGY LOSS DEVICE

[75] Inventor: Paul A. Smirl, Laguna Beach, Calif.

[73] Assignee: Control Components, Inc., Rancho Santa Margarita, Calif.

[21] Appl. No.: 170,911

[22] Filed: Dec. 20, 1993

[30] Foreign Application Priority Data

Dec. 18, 1992 [GB] United Kingdom ............... 9226404

[51] Int. Cl.6 ............................................. F16K 47/08
[52] U.S. Cl. .............................. 251/127; 137/625.3; 138/42; 138/43
[58] Field of Search ................... 251/127; 137/625.3, 137/625.27; 138/42, 43

[56] References Cited

U.S. PATENT DOCUMENTS

| | | | |
|---|---|---|---|
| 3,780,767 | 12/1973 | Borg et al. | 137/625.37 X |
| 3,894,716 | 7/1975 | Barb . | |
| 3,941,350 | 3/1976 | Kluczynski | 137/625.37 X |
| 4,267,045 | 5/1981 | Hoof | 138/42 X |
| 4,398,563 | 8/1983 | Kay et al. | 137/625.37 X |

FOREIGN PATENT DOCUMENTS

| | | |
|---|---|---|
| 1405850 | 9/1975 | United Kingdom . |
| 1475140 | 6/1977 | United Kingdom . |
| 1561155 | 2/1980 | United Kingdom . |

*Primary Examiner*—Arnold Rosenthal
*Attorney, Agent, or Firm*—Cushman, Darby & Cushman

[57] ABSTRACT

In order to discipate energy from a high pressure fluid without causing damage and environmental nuisanse an energy loss device is used. This device includes energy loss paths including void areas arranged to draw energy from the high pressure fluid as it passes through the path. These paths may also include turns and other features to enhance energy loss.

6 Claims, 3 Drawing Sheets

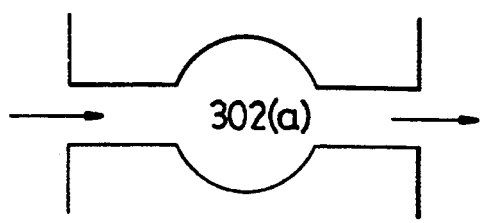
Fig. 3(a)
Fig. 3(b)
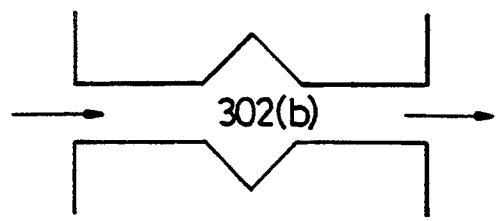
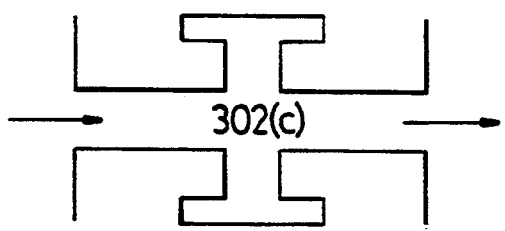
Fig. 3(c)
Fig. 3(d)
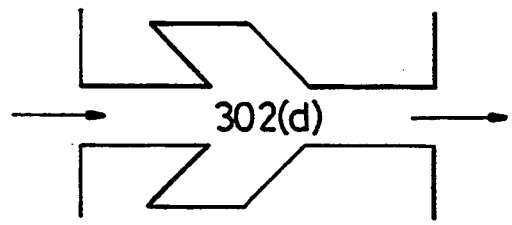
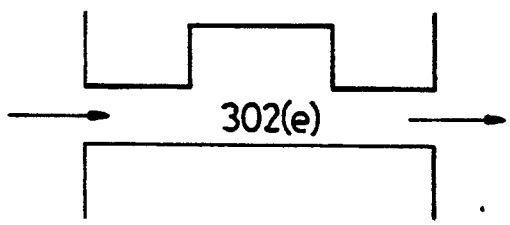
Fig. 3(e)
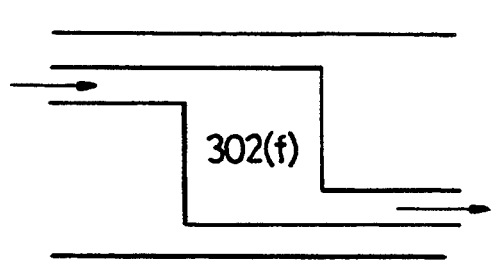
Fig. 3(f)
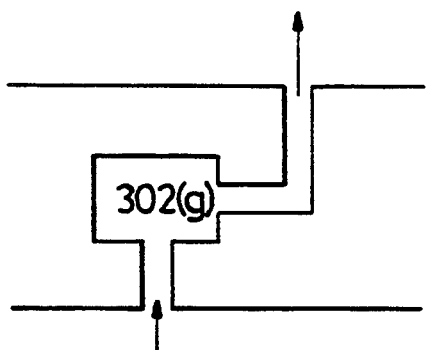
Fig. 3(g)

ENERGY LOSS DEVICE

BACKGROUND OF THE INVENTION

1. Field of the Invention

The present invention generally relates to devices which provide velocity control of high pressure flowing fluids, both liquids and gases.

2. Description of the Prior Art

In the handling of flowing high pressure fluids, it has been customary to utilize orifice means having a high velocity short throat section to attain energy losses or high pressure drops. If the fluid is in a liquid state and liable to flash, that is, vaporize or turn to a gaseous condition on the downstream side of the orifice or valve opening, it may condense implosively and induce damaging shock waves, cause erosion, and the like. Also, as the velocity of the fluid in the valve exceeds the velocity of the fluid in the line, several disturbing reactions occur. The most serious problem is rapid erosion of the valve seat plug by direct impingement of the liquid and any foreign particles suspended therein. Additional erosion results from cavitation. Cavitation may be defined as the high speed implosion of vapor against the valve trim and body.

In addition to the severe problems resulting from erosion, the increased velocity also causes the flow characteristics of the valve to become unpredictable and erratic. This occurs because the changes in velocity significantly affect the valve vena contracta vortexes and fluid enthalpies.

Other objectional problems created by the high fluid velocity in the valve are severe noise generation, trim fatigue and possible degradation of flowing fluid materials such, for example, as polymers.

The foregoing and other deficiencies were somewhat overcome by more recent devices which affect dissipation of energy of a flowing high pressure fluid by subdividing it into a plurality of passageways and labyrinths in which there are rapid changes of direction. An example of such devices may be found in U.S. Pat. No. 3,514,074 and 3,513,864. These devices are formed as a series of cylindrically stacked members having inlets and outlets formed along concentric circular peripheries of each member with a labyrinth being formed there between.

Fluid borne noise downstream of control valves is very high. If not treated or contained within a pipe, this noise can result in sound pressure levels of 110 to 170 dB three feet from the valve exit. Sound sources of this magnitude are hazardous, to personnel and frequently result in complaints from local residents.

Mufflers and silencers can only attenuate fluid borne noise 20 to 30 dB. Therefore, only partial success has been achieved with them in obtaining desired sound pressure levels.

Furthermore, a typical path treatment system i.e., the muffler, lagging support structure etc is very cumbersome and expensive, often, the total cost of path treatment can exceed the valve cost many times over.

SUMMARY OF THE INVENTION

The discussed problems associated with the prior art devices along with other problems are effectively solved by the present invention which provides a compact energy loss device.

The device is formed as a rigid structure made up of a number of members joined together to have adjoining faces. Between these adjoining faces are formed a series of energy loss paths for conducting fluid flow there along so as to provide an energy loss to the fluid. The fluid enters these paths from a series of inlets formed along the periphery of a first geometrical configuration, usually circular, to provide a first total inlet area. The fluid is exhausted from the series of paths from a series of outlets formed along the periphery.

These and other aspects of the present invention will be more apparent after a review of the following description of the preferred embodiment when considered with the accompanying drawings.

In accordance with the present invention there is provided a fluid flow controlling device comprising:

a plurality of members joined together into a rigid structure to define a series of energy loss paths for fluid flow, said plurality of members including a series of disks having abutting surfaces and forming energy loss paths there between for fluid flow there along wherein at least one of the energy loss paths of the disk includes a void between the inlet and outlet of the disk, the void expanding the cross-sectional area of the said energy loss path of the disk;

inlet means centrally formed in said members along a first configuration to define a predetermined inlet area for conducting fluid to the series of paths formed by said plurality of members; and, outlet means associated with said inlet means and about said rigid structure to provide a series of openings for exhausting fluid from the energy loss paths of said rigid structure.

Preferably, the void may have a cross-section that is rectilinear or rounded or diamond shaped or T shaped or arrowhead shaped or any other shape that provides for expansion and contraction of the fluid flow in the energy loss path.

The fluid flow control device may include energy loss paths that include turns or deviations in their configuration to further enhance energy loss.

BRIEF DESCRIPTION OF THE DRAWINGS

FIGS. 3(a)-3(g) illustrate in plan schematic form a range of additional expansion or void area configurations that embody the present invention, these figures are referred to as:

FIG. 3(a) illustrating a rounded void 302(a);

FIG. 3(b) illustrating a diamond shaped void 302(b);

FIG. 3(c) illustrating a T-shaped void 302(c);

FIG. 3(d) illustrating an arrowhead shaped void;

FIG. 3(e) illustrating an off-centre void 302(e);

FIG. 3(f) illustrating a void 302(f) having mis-aligned inlet and outlet passages; and, FIG. 3(g) illustrating a void 302(g) having inlet and outlet passages in a perpendicular relationship.

DESCRIPTION OF THE REFERRED EMBODIMENT

Figure 1:
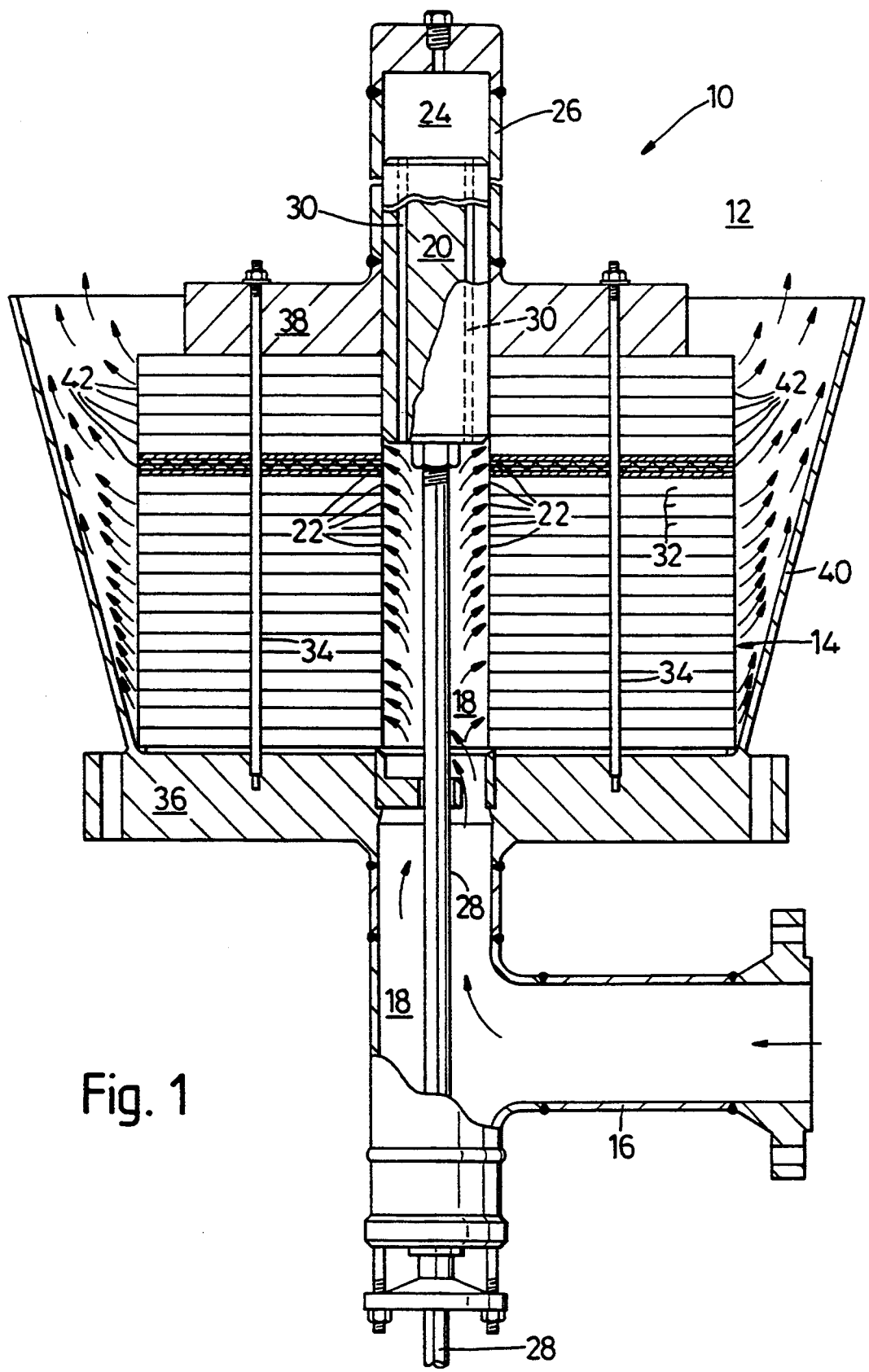
FIG. 1 is a longitudinal cross-section of an exhaust valve utilizing the energy loss stack of the present invention.

Referring now to the drawings, FIG. 1 discloses a steam exhaust valve assembly 10 for exhausting a predetermined amount of steam to the atmosphere 12 through an inlet 16 and flows into a chamber 18 from which a predetermined amount of the steam is allowed to exhaust through the stack assembly 14 by a movable valve plug 20. The valve plug 20 is movable between a first position completely blocking the steam from entering the stack assembly 14 by completely blocking all the inlets 22 of the stack assembly 14 and a second position opening all the inlets 22 by moving up into a space 24 formed by a top casing 26 of the valve assembly 10. The plug 20 is moved by a connecting rod 28 connected to an actuator (not shown) which is responsive to system control signals in a well-known manner. To minimize the force that the actuator has to exert to move the plug 20 between positions steam pressure is balanced across the plug 20 by providing a pair of passageways 30 extending longitudinally across the plug 20 for steam communication between the chamber and the space 24.

The disk stack assembly 14 includes a series of individual disks 32 which are aligned with respect to the plug 20 and are clamped together by tension rods 34 between a bottom mounting plate 36 to encompass the stack assembly 14 and safely direct the steam exiting from outlets 42 of the stack assembly up into the atmosphere. The disk stack assembly provides a labyrinth for the steam as it travels from the inlets 22 to the outlets 42 by means of variously configured disks 32 as it will be disclosed later.

Figure 2:
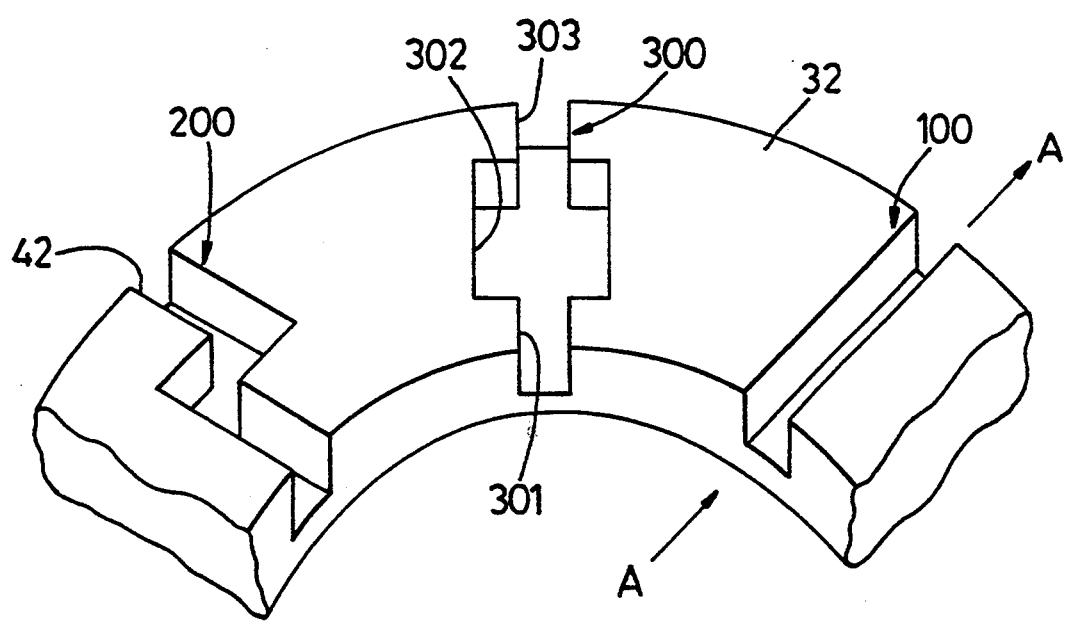
FIG. 2 is a schematic illustration of three variations of energy loss path, one with zero turns, one with 2 turns and an energy loss path of the present invention.

Turning to FIG. 2 illustrating in schematic form energy loss path configurations for incorporating in disks 32. A zero turn path 100 comprises a simple passage through which fluid can flow. A two turn path 200 has two perpendicular turns in its path to enhance energy loss from a fluid as it passes through path 200. The present invention is embodied for example by path 300 wherein an expansion or void area 302 is located in the path 300 to enhance energy loss.

Considering prior art path 100, it will be appreciated that a fluid such as steam passes through the path 100 in the direction of arrow A. The fluid upon passage through the path 100 losses energy due to the constriction of the path 100. Thus, the destructive and other retrograde effects of the fluid are diminished. Evidently, the constriction of the path 100 is limited so the degree of energy loss by a fluid passing through the path 100 is small. A stack 14 constructed of disks 32 including only paths similar, to path 100 is adequate for low pressure systems. However, a high pressure fluid would not be sufficiently diminished by a simple zero turn path 100 unless the path were of unacceptable length. Furthermore, the stack would rapidly erode and make considerable noise.

Where high pressure fluids must be diminished by the stack 14 then at least some of the energy loss paths may be of a type similar to path 200 Of FIG. 2. These two turn paths create a labyrinth through which the fluid must flow. The labyrinth effectively absorbing energy through the path walls to diminish the fluid energy significantly prior to venting through outlets 42. It will be appreciated that an energy loss path through a stack could comprise several loss paths 100 and/or 200 in its length to facilitate desired energy loss. These paths 100 and 200 could also be arranged in series in the same path by suitable Connection between. Furthermore, the fluid could be oil, gas or any other chemical fluid in addition to steam.

The present invention is illustrated with regard to energy path 300 comprising an inlet passage 301, the expansion or void area 302 and an outlet passage 303. As with path 100 and 200, the fluid flow passes from the interior of the disk through inlet passage 301 in the disk. The expansion or void area 302 presents a rapidly increased cross-sectional area to the fluid flow. Thus, by an inverted-venturi effect the fluid flow looses energy. It will be appreciated that in order to maximise the energy loss by the fluid flow passing through path 300, it is beneficial to have the inlet passage 301 expand as rapidly as possible into the void 302. Thus, it is most convenient if the passages 301 and 302 are juxtaposed to ensure at least a perpendicular relationship there between.

FIG. 3 illustrates some alternative configurations for the void 302 and inlet passage 301 and outlet passage 303. These various configurations allow choice of energy loss path to enable appropriate design of an energy loss stack to suit predicted or required performance criteria. FIG. 3(a) has a rounded void 302 and so has a less violent volume increase reducing the possibility of gas condensation for example. Similarly, FIG. 3(b) includes a diamond shaped void 302(b) in which fluid expansion upon passing into the void 302(b) is less immediate. FIG. 3(c) illustrates a void area 302(c) comprising two T sections either side of the energy loss path, this configuration allows relatively large expansion and so energy loss whilst still maintaining a fair degree of fluid entrainment down the path due to the reduced void width. In order to achieve more rapid expansion than can be achieved with a perpendicular walled rectangle void 302 as illustrated in FIG. 2, it is possible to use arrowhead type configurations as illustrated in FIG. 3(d). These arrowhead type configurations allow a fluid flow to expand rapidly upon entry to the void 302(d). It will be appreciated that it is most convenient if the void 302 is symmetrical about the energy loss path in order to maximise expansion volume. However, as illustrated in FIG. 3(e) it is possible to position the void 302(e) off-centre to allow expansion but retain a degree of fluid flow entrainment. Finally, in order to further enhance energy loss by the fluid it is possible to combine the present invention with prior two turn configurations as illustrated with regard to path 200 in FIG. 2. FIG. 3(f) illustrates such a void configuration in which the inlet passage and the outlet passage are out of alignment, and so creates a turn in the path. However, the void 302(f) makes this turn quite defuse in nature. FIG. 3(g) illustrates a further configuration of the present invention in which a void 302(g) is arranged to have its inlet passage and outlet passages in a perpendicular relationship. Thus, a fluid flow looses energy both as a result of the void 302(g) and as a result of the two turns in the energy loss path between inlet 301 and outlet 303.

Returning to FIG. 2 it is conventional for the inlet passage 301 to have a slightly smaller width compared to the outlet passage 303. Thus, the inlet passage 301 may nave a width of 0.2" (5 mm) whilst the outlet passage 303 may have a width of 0.25" (6.25 mm). However, the depth of these passages may be the same i.e. 0.19" (4.75 mm). The width of the void or expansion area 302 is dependent to a large extent upon the degree of fluid flow energy loss required. However, for the inlet passage 301 and outlet passage 303 widths defined above, a void width of 0.4" (10 mm) would be suitable. Furthermore, the void 302 would normally have the same depth as the inlet passage 301 or outlet passage 303.

In essence the present invention comprises a zero turn energy loss path having a void along its length providing expansion and contraction effects upon the fluid flow to precipitate energy loss. Furthermore, with the dimensions mentioned above there is an expansion of 1.072 times from the inlet passage 301 to the outlet passage 303 and, it can be shown, that such an energy loss path is equivalent to a 1.24 turns energy loss path of similar dimensions.

As indicated previously an energy loss stack comprises several disks including energy loss paths from their interior periphery to their exterior periphery. These energy loss paths may be prior known paths 100, 200 or the present energy loss path 300. Typically, the disks have an etched or machined side in which the energy loss paths are constructed and a flat side. A fabricated stack will be constructed such that adjacent disks form the energy loss paths. It is also possible for the disks to have etched or machined paths in both sides to create energy loss paths.

The disks 14 are formed into stacks assembly 14 by aligning and stacking the disks 14 on top of the each other. Thus, path grooves in a top disk will align with similar path grooves in a bottom disk or a flat surface to create an energy loss path from the interior of the disk to the exterior. The stack assembly 14 will usually comprise a large number of disks and so it is possible to not only have energy loss paths that remain in the plane of a single disk but also energy loss paths that pass up and down the stack assembly 14 through several energy paths 100, 200 and 300 in FIG. 2. These paths may be in series with each other or distributed within the disk such that there is energy loss path forking to create two paths from one 'parent' path. Thus, each disk may include several hundred energy loss paths radiating from its central interior periphery to its external periphery. These energy loss paths provide a controlled increase in expansion cross-sectional area for the fluid flow as it crosses the disk and so passes through the stack 14. This control reduces the environmental damage that can be caused by the fluid flow.

I claim:

1. A fluid flow controlling device comprising:

a plurality of members joined together into a rigid structure to define a series of radial respectively isolated energy loss paths for fluid flow, said plurality of members including a series of disks having abutting surfaces and forming said energy loss paths in a respective common plane there between for fluid flow there along wherein at least one of the energy loss paths of the disk includes a void between the inlet and outlet of the disk, the void expanding the cross-sectional area of the said energy loss path of the disk;

inlet means centrally formed in said members along a first configuration to define a predetermined inlet area for conducting fluid to the series of paths formed by said plurality of members; and, outlet means associated with said inlet means and about said rigid structure to provide a series of openings for exhausting fluid from the energy loss paths of said rigid structure.

2. A fluid flow controlling device as claimed in claim 1 wherein the void has a cross-sectional shape that is one of rectilinear, rounded, diamond shaped, T shaped and arrowhead shaped.

3. A fluid flow controlling device as claimed in claim 1 wherein the energy loss paths include turns or deviations in their configuration to further enhance energy loss.

4. A fluid flow controlling device as claimed in claim 1 wherein the device is arranged to exhaust high pressure steam.

5. A fluid flow controlling device as claimed in claim 1 wherein the inlet passage has a width of 0.20" (5.0 mm) and the outlet passage a width of 0.25" (6.25 mm) with a passage depth of 0.19" (4.75 mm) whilst the void has a width of 0.4" (10 mm) and a similar depth as the inlet and outlet passages.

6. A fluid flow controlling device as claimed in claim 1, wherein each energy loss path comprises a groove defined in a said disk, said energy loss paths having a vertical dimension less than or equal to a vertical dimension of a said disk.

* * * * *